United States Patent
Bjerge et al.

(10) Patent No.: US 9,140,238 B2
(45) Date of Patent: Sep. 22, 2015

(54) METHOD TO CONTROL THE OPERATION OF A WIND TURBINE

(71) Applicants: Martin Huus Bjerge, Kibæk (DK); Thomas Esbensen, Herning (DK); Jesper Elliot Petersen, Olgod (DK)

(72) Inventors: Martin Huus Bjerge, Kibæk (DK); Thomas Esbensen, Herning (DK); Jesper Elliot Petersen, Olgod (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 62 days.

(21) Appl. No.: 13/777,126

(22) Filed: Feb. 26, 2013

(65) Prior Publication Data

US 2013/0234437 A1 Sep. 12, 2013

(30) Foreign Application Priority Data

Mar. 7, 2012 (EP) .................... 12158421

(51) Int. Cl.
| | |
|---|---|
| *F03D 9/00* | (2006.01) |
| *F03D 7/02* | (2006.01) |
| *F03D 7/04* | (2006.01) |

(52) U.S. Cl.
CPC .......... *F03D 7/0224* (2013.01); *F03D 7/028* (2013.01); *F03D 7/0276* (2013.01); *F03D 7/043* (2013.01); *F05B 2270/32* (2013.01); *F05B 2270/3201* (2013.01); *F05B 2270/322* (2013.01); *Y02E 10/723* (2013.01)

(58) Field of Classification Search
USPC ...................... 290/44, 55; 416/1, 35
IPC F03D 7/0224,7/028, 7/00, 7/043; Y02E 10/723
See application file for complete search history.

(56) References Cited

U.S. PATENT DOCUMENTS

| | | | | |
|---|---|---|---|---|
| 4,160,170 | A * | 7/1979 | Harner et al. | 290/44 |
| 4,161,658 | A * | 7/1979 | Patrick | 290/44 |
| 4,189,648 | A * | 2/1980 | Harner | 290/44 |
| 4,193,005 | A * | 3/1980 | Kos et al. | 290/44 |
| 4,339,666 | A * | 7/1982 | Patrick et al. | 290/44 |
| 7,476,985 | B2 | 1/2009 | Llorente Gonzalez | |
| 7,883,317 | B2 * | 2/2011 | Ormel et al. | 416/1 |
| 8,279,073 | B2 * | 10/2012 | Gao et al. | 340/635 |
| 8,593,006 | B2 * | 11/2013 | Wohlleb | 290/44 |
| 2006/0028025 | A1 | 2/2006 | Kikuchi et al. | |
| 2007/0018457 | A1 | 1/2007 | Llorente Gonzalez | |

(Continued)

FOREIGN PATENT DOCUMENTS

| | | |
|---|---|---|
| DE | 102007035724 A1 | 2/2009 |
| DE | 102008020154 B4 | 4/2011 |

(Continued)

*Primary Examiner* — Vanessa Girardi

(57) ABSTRACT

A method to control the operation of a wind turbine above a wind speed threshold value and a wind turbine designed to execute the method are provided. Electrical output power of the wind turbine is produced by its rotating blades and fed into a grid, which is connected with the wind turbine. The wind turbine is controlled by a first control loop and a second control loop. The wind speed is determined and compared with a certain predefined wind speed threshold value. Wind turbulences are determined and compared with a predefined wind turbulence threshold value. The first control loop and the second control loop are activated when the wind speed reaches or exceeds the wind speed threshold value. The activated first control loop controls the output power dependent on the wind speed. The activated second control loop controls the rotational speed of the rotating blades dependent on the wind turbulences.

16 Claims, 1 Drawing Sheet

(56) References Cited

U.S. PATENT DOCUMENTS

| | | |
|---|---|---|
| 2007/0216166 A1 | 9/2007 | Schubert |
| 2008/0001411 A1 | 1/2008 | Ichinose et al. |
| 2011/0221194 A1 | 9/2011 | Egedal et al. |

FOREIGN PATENT DOCUMENTS

| | | |
|---|---|---|
| EP | 0847496 B1 | 8/2000 |
| EP | 1497556 B1 | 11/2005 |
| EP | 1990539 A1 | 11/2008 |
| EP | 2022981 A1 | 2/2009 |
| EP | 2090775 A2 | 8/2009 |
| EP | 2096301 A2 | 9/2009 |
| EP | 2154362 A1 | 2/2010 |
| EP | 2233736 A2 | 9/2010 |
| WO | WO 0133075 A1 | 5/2001 |
| WO | WO 2007135573 A2 | 11/2007 |
| WO | WO 2008131775 A2 | 11/2008 |
| WO | WO 2008131776 | 11/2008 |
| WO | WO 2008131778 A2 | 11/2008 |

\* cited by examiner

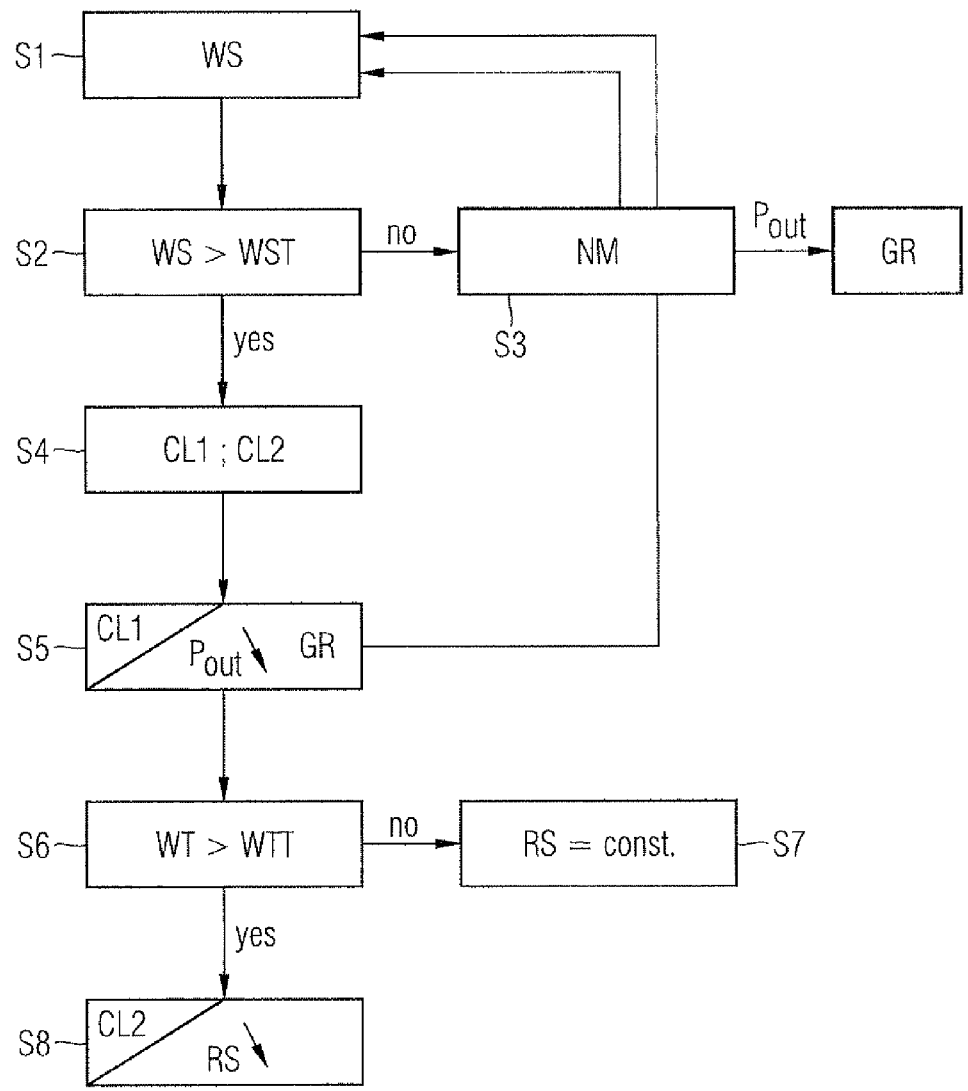

METHOD TO CONTROL THE OPERATION OF A WIND TURBINE

CROSS REFERENCE TO RELATED APPLICATIONS

This application claims priority of European Patent Office application No. 12158421.3 EP filed Mar. 7, 2012. All of the applications are incorporated by reference herein in their entirety.

FIELD OF INVENTION

A method to control the operation of a wind turbine above a certain wind speed threshold value is provided. In addition a wind turbine is provided, which is prepared and designed to execute this method.

BACKGROUND OF INVENTION

A wind turbine and its components are designed to withstand and to cope with high wind speeds. The wind turbine might be exposed to a wind speed, which is higher than 25 m/s for example. This wind speed is known by wind turbine manufacturers as a typical "wind speed threshold value".

Quite high mechanical loads are acting on the wind turbines' components if a given wind speed threshold value is reached and even topped.

It is known to change the pitch angle of the rotating wind turbine blades until a so called "feathered position" of the blades is reached if the measured and averaged wind speed reaches the threshold value. Thus the wind load, which is acting on the blades, is reduced and thus a (fatigue) load is avoided.

It is even known to disconnect the wind turbine from the electrical grid if a so called "high wind situation" with a high wind speed is reached at the site of the wind turbine.

As a drawback electrical energy and thus money is lost for the wind turbine operator if the wind turbine is close to this limiting operational range.

Document EP 0 847 496 B1 describes another solution if the "high wind situation" is reached.

According to the method described the nominal output power of the wind turbine as well as the rotational speed of the rotor are continuously reduced if a certain wind velocity is reached. Thus an overload of the wind turbine and its components are avoided. The continuous reduction of the output power and of the rotational speed of the rotor is done in dependency of the rise in the wind velocity. During the procedure the wind turbine stays connected with the grid. Thus the disconnection of the wind turbine is avoided or is at least delayed. As electrical power is still fed into the grid financial losses are minimized or even avoided.

There is a drawback, which is related to this method as described in EP 0 847 496 A. There always will be situations with a wind speed threshold being reached, while the wind turbine and its components are not endangered by fatigue loads at the same time.

According to the EP 0 847 496 A the wind turbine would reduce the rotational speed and even the electrical output power thus potential produced output power is lost for the operator unnecessarily. Thus in those situation the method is not cost-effective.

Document EP 1497556 B1 discloses another control method, where the power output of the turbine is regulated. The rotor speed is regulated within a predefined wind speed range by varying the rotor blade angle. The output power is reduced in excess of a defined wind-speed-dependent threshold value, while a defined rotor blade limiting angle is used as threshold value.

Other attempts to operate wind turbines in high wind speed situations are described in WO 28121775 A, WO 28121776 A and WO 28121778 A.

SUMMARY OF INVENTION

An improved method and an improved wind turbine is provided in view of the prior art documents. Thus the operation of the wind turbine above a certain wind speed threshold value is allowed in an improved manner.

This aim is solved by the features of the claims. Preferred configurations are addressed by the dependent claims.

The wind turbine comprises at least a rotor, a pitch-system and a generator. Wind turbine blades of the rotor are driven by the wind, thus the rotor rotates with a specific rotational speed.

The rotor is coupled with the generator by a rotating shaft for example. Thus the generator is even driven by the wind generating electrical power in dependency of the rotating blades of the rotor.

The electrical power of the generator is adjusted in its electrical values (i.e. frequency, amplitude, phase angle) and is fed into a grid, which is connected with the wind turbine.

In a preferred configuration the generator is connected with a converter, while the converter is used to adjust the output power of the generator in view to the requirements of the grid connected.

In another preferred configuration the generator used is a torque controlled generator.

The rotating blades of the rotor are connected with a pitch system. The pitch system is used to adjust the pitch angle of the blades to the direction of the incoming wind. The pitch angle is adjusted in a way that an optimized amount of wind energy is transformed into rotational speed and generated electrical power.

The wind turbine in view to its overall performance is controlled by a first control loop and by a second control loop.

The output power of the wind turbine, which is fed into the grid, is controlled by the first control loop.

The rotational speed of the wind turbine rotor and thus the rotational speed of the rotating wind turbine blades are controlled by the second control loop.

The first control loop and the second control loop are activated, if predefined certain wind speed threshold values are reached or even exceeded.

In a preferred configuration the first control loop is activated if a first predefined certain wind speed threshold value is reached or is even exceeded. The second control loop is activated if a second predefined certain wind speed threshold value is reached or is even exceeded, accordingly.

In a preferred configuration the first predefined certain wind speed threshold value and the second predefined certain wind speed threshold value are the same, they are equal in its value.

In a preferred configuration the certain wind speed threshold value is defined and well known as those wind speed value, which might lead to damaged wind turbine components of the wind speed value is exceeded.

For example wind speeds, which are higher than 25 m/s might lead to damaged components. Thus this 25 m/s value might be used as wind speed threshold value.

The first control loop and the second control loop are activated and operated independently to each other.

The first control loop is prepared and arranged to influence the output power of the wind turbine, which is fed in the grid.

The output power, which is fed in the grid, is reduced from a nominal value to a lower value if the wind speed threshold value is reached or even exceeded.

In a preferred configuration the output power is reduced in dependency of the increasing wind speed. Thus the power reduction might be done in a continuous and proportional manner in view to the continuous and proportional increase of the wind speed.

In a preferred configuration the pitch position of the blades or an allocated pitch reference value might be used to determine the wind speed. The pitch position as well as the pitch reference value is a function of the wind speed, thus this knowledge, which is already implemented in the wind turbine, might be used for this purpose.

In a preferred configuration the wind speed is measured by a cup anemometer or by a so called "FT sensor", which measures the wind speed by an acoustic resonance measurement for example.

The cup anemometer or the sensor might be arranged at the wind turbine or at a meteorological mast, which is allocated to the wind turbine.

In a preferred configuration the measured wind speed is averaged over a certain predefined time period. Thus the averaged wind speed is used to activate both loops or to operate and control the first control loop.

The output power of the wind turbine is preferably reduced by the converter, which is arranged between the generator of the wind turbine and the grid.

The output power of the wind turbine is preferably reduced by the torque controlled generator, if there is one used in the wind turbine.

In a preferred configuration the wind speed might be determined by monitoring the rotational speed of the turning shaft, which drives the generator.

The second control loop is prepared and arranged to control the rotational speed of the rotor or of the rotating wind turbine blades.

The rotational speed is reduced from a nominal value to a lower value if a wind turbulence threshold value is reached or even exceeded.

The certain wind turbulence threshold value is defined and well known as it is those wind turbulence value, which might lead to damaged components of the wind turbine if it is exceeded.

In a preferred configuration the rotational speed is reduced in dependency of increasing wind turbulences. Thus the rotational speed reduction might be done in a continuous and proportional manner in view to a continuous and proportional increase of the wind turbulences.

In a preferred configuration the rotor speed acceleration is monitored, as it is a function of the wind turbulences. Thus this knowledge, which is already implemented in the wind turbine, might be used for this purpose.

In a preferred configuration wind turbulence values are monitored and averaged over a certain predefined time period. Thus the averaged values are used for the reduction of the rotational speed.

Now there are different operational modes of the wind turbine according to preferred configurations of the invention:

If the wind speed is below the wind speed threshold value the wind turbine is operated in its known "normal" mode. The first control loop and the second control loop are not activated. The output power of the wind turbine, which is fed in the grid, is optimized in regard to a nominal output power value. The optimization is done in view to the incoming wind and in view to a stable grid and its conditions.

If the wind speed reaches the wind speed threshold value or even exceeds this threshold value, the first control loop and the second control loop of the wind turbine are activated.

In this case the output power of the wind turbine is reduced by the first control loop from a nominal value to a lower value as described above.

If the wind turbulences are below the wind turbulence threshold value the rotational speed of the rotor is kept constant even if the wind speed further increases. This is preferably done by an adjustment of the pitch angles of the blades.

If the wind turbulences reaches or exceeds the wind turbulence threshold value the rotational speed of the rotor is reduced. This is preferably done by an adjustment of the pitch angles of the blades.

Thus if a critical wind speed is reached the output power of the wind turbine, which is fed in the grid, is reduced before the rotational speed of the rotor is reduced.

The provided method and wind turbine allows the control of the produced power as well as the control of the rotational speed of the rotor. Both controls are performed in an independent manner thus the usable time period for feeding power in the grid is prolonged.

The provided method and wind turbine allows the wind turbine to stay connected with the grid even during high-wind situations in an advantageous manner.

The provided method and wind turbine ensures that wind turbine components are held below their fatigue load limits. Thus the lifetime of the components is not limited by the operation of the wind turbine in high wind situations.

The provided method and wind turbine allows keeping a nominal rotational speed of the rotor and to reduce at the same time the output power of the wind turbine. Thus fewer loads are induced on the wind turbine components (i.e. the blades, the drive-train, the shaft, etc.).

BRIEF DESCRIPTION OF THE DRAWINGS

The provided method and wind turbine is shown in more detail by help of FIG. 1.

DETAILED DESCRIPTION OF INVENTION

In a first step S1 the wind speed WS is determined

In a second step S2 the wind speed is compared with the wind speed threshold value WST.

If the wind speed WS is below the wind speed threshold value WST the wind turbine is operated in a normal mode NM as shown in step S3. Thus the output power Pout of the wind turbine, which is fed in the grid GR, is optimized in regard to a nominal output power value of the wind turbine.

The optimization is done in view to the incoming wind and in view to a stable grid and its conditions. The determination of the wind speed WS is continued.

If the wind speed WS reaches the wind speed threshold value WST or even exceeds this threshold value WST, the first control loop CL1 and the second control loop CL2 of the wind turbine are activated as shown in the step S4.

As shown in step S5 the output power Pout of the wind turbine, which is fed in the grid GR, is reduced by the first control loop CL1 from a nominal value to a lower value. This is preferably done in dependency to the dynamic behavior or increase of the wind speed WS.

In step S6 the wind turbulences WT are determined and are compared with the wind turbulence threshold value WTT.

If the wind turbulences WT are below the wind turbulence threshold value WTT the rotational speed RS of the rotor is kept at a predefined value as shown in step S7.

Thus the rotational speed RS stays constant even if the wind speed WS should increase further. The value of the rotational speed RS is kept constant by an adjustment of the pitch angles of the blades preferably.

If the wind turbulences WT reaches or exceeds the wind turbulence threshold value WTT the rotational speed RS of the rotor is reduced by the second loop CL2.

This is shown in step S8. This reduction is preferably done by an adjustment of the pitch angles of the blades.

We claim:

1. A method to control the operation of a wind turbine above a certain wind speed threshold value, comprising:
   producing electrical output power by rotating blades of the wind turbine and wherein the produced output power is fed in a grid, which is connected with the wind turbine;
   controlling the wind turbine by a first control loop and by a second control loop;
   determining the wind speed and comparing the wind speed with a certain predefined wind speed threshold value;
   determining wind turbulences and comparing the wind turbulences with a certain predefined wind turbulence threshold value; and
   activating the first control loop and the second control loop when the wind speed reaches or exceeds the wind speed threshold value,
   wherein the activated first control loop controls the output power in dependency of the wind speed, and
   wherein the activated second control loop controls a rotational speed of the rotating blades in dependency of the wind turbulences.

2. The method according to claim 1, wherein the output power of the wind turbine is reduced from a nominal value to a lower value when the determined wind speed reaches or exceeds the wind speed threshold value.

3. The method according to claim 1,
   wherein a pitch position of the blades or an allocated pitch reference value is used to determine the wind speed.

4. The method according to claim 1,
   wherein the wind speed is measured by a cup anemometer or by a FT-sensor.

5. The method according to clam 1,
   wherein the wind speed is determined by monitoring a rotational speed of a shaft driving the wind turbine generator.

6. The method according to claim 1, wherein the wind speed is averaged over a certain predefined time period before being used to activate both the first and the second control loop.

7. The method according to claim 1, wherein the wind turbulence threshold value is defined as a wind turbulence value leading to damaged components of the wind turbine when exceeded.

8. The method according to claim 1, wherein an acceleration of the rotating blades or the rotor speed is monitored as a function of the wind turbulences.

9. The method according to claim 1, wherein wind turbulence values are monitored and averaged over a certain predefined time period before being used by the second control loop.

10. The method according to claim 1,
    wherein the rotational speed is kept constant when the wind turbulences are below the wind turbulence threshold value, and
    wherein the rotational speed is reduced when the wind turbulences reach or exceed the wind turbulence threshold value.

11. A wind turbine, comprising:
    a plurality of rotating blades;
    a first control loop;
    a second control loop; and
    means arranged and prepared to execute the method according to claim 1,
    wherein the operation of the wind turbine is controlled above a certain wind speed threshold value.

12. The method according to claim 1, wherein the output power is reduced in dependency of increasing wind speed.

13. The method according to claim 12, wherein the reduction of the output power is done in a continuous and proportional manner when the wind speed increases in a continuous and proportional manner.

14. The method according to claim 1, wherein the rotational speed of the rotating blades is reduced from a nominal value to a lower value when the wind turbulence threshold value is reached or exceeded.

15. The method according to claim 14, wherein the rotational speed is reduced in dependency of increasing wind turbulences.

16. The method according to claim 15, wherein the rotational speed is reduced in a continuous and proportional manner when the wind turbulences increase in a continuous and proportional manner.

* * * * *